(12) United States Patent
Nakamura

(10) Patent No.: US 10,477,267 B2
(45) Date of Patent: Nov. 12, 2019

(54) INFORMATION PROCESSING DEVICE, INFORMATION PROCESSING METHOD, INFORMATION PROVISION DEVICE, AND INFORMATION PROVISION SYSTEM

(75) Inventor: Hitoshi Nakamura, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/348,960

(22) PCT Filed: Aug. 27, 2012

(86) PCT No.: PCT/JP2012/071567
§ 371 (c)(1),
(2), (4) Date: Apr. 1, 2014

(87) PCT Pub. No.: WO2013/073250
PCT Pub. Date: May 23, 2013

(65) Prior Publication Data
US 2014/0245338 A1    Aug. 28, 2014

(30) Foreign Application Priority Data

Nov. 16, 2011  (JP) .................................. 2011-250718

(51) Int. Cl.
*H04N 21/439* (2011.01)
*H04N 21/658* (2011.01)
(Continued)

(52) U.S. Cl.
CPC ......... *H04N 21/4394* (2013.01); *G06F 21/16* (2013.01); *H04N 21/233* (2013.01);
(Continued)

(58) Field of Classification Search
CPC ........... H04N 21/4348; H04N 21/8358; H04N 21/8458; H04N 21/858; H04N 7/08;
(Continued)

(56) References Cited

U.S. PATENT DOCUMENTS

| 4,052,563 A | * | 10/1977 | Noda ..................... H04J 3/1688 370/535 |
| 5,953,485 A | * | 9/1999 | Abecassis ..................... 386/278 |

(Continued)

FOREIGN PATENT DOCUMENTS

| CN | 1759396 A | 4/2006 |
| EP | 1 760 693 A1 | 3/2007 |

(Continued)

OTHER PUBLICATIONS

International Search Report dated Nov. 20, 2012 in PCT/JP2012/071567.

(Continued)

Primary Examiner — Robert J Hance
Assistant Examiner — Jen-Shi Huang
(74) Attorney, Agent, or Firm — Oblon, McClelland, Maier & Neustadt, L.L.P.

(57) ABSTRACT

An ACR service is realized by an information provision server which has not prepared feature point information of a sub sound because only the feature point information is extracted from a main sound and an inquiry is made to the information provision server even when the sub sound is listened to in a client device. In addition, even when content that has a main sound and a plurality of pieces of audio information is distributed, it is not necessary for the information provision server to prepare feature point information of sub sounds, and the capacity of the database may not increase.

11 Claims, 4 Drawing Sheets

(51) Int. Cl.
*H04N 21/233* (2011.01)
*H04N 21/8358* (2011.01)
*H04N 21/2389* (2011.01)
*G06F 21/16* (2013.01)

(52) U.S. Cl.
CPC ... *H04N 21/23892* (2013.01); *H04N 21/6582* (2013.01); *H04N 21/8358* (2013.01)

(58) Field of Classification Search
CPC .......... H04N 21/233; H04N 21/23892; H04N 21/4394; H04N 21/6582; G06K 9/00744; G06F 21/16; G06F 17/30787
See application file for complete search history.

(56) References Cited

U.S. PATENT DOCUMENTS

| | | | |
|---|---|---|---|
| 2002/0007371 A1* | 1/2002 | Bray | H04N 5/44513 715/205 |
| 2003/0016945 A1* | 1/2003 | Nakamura | G06F 17/30787 386/239 |
| 2004/0260682 A1* | 12/2004 | Herley | G06K 9/00496 |
| 2005/0197724 A1* | 9/2005 | Neogi | G10L 25/48 700/94 |
| 2006/0218126 A1 | 9/2006 | De Ruijter et al. | |
| 2007/0116317 A1* | 5/2007 | Ozawa | G06F 17/30743 381/372 |
| 2008/0101632 A1* | 5/2008 | Lee | H04R 5/04 381/307 |
| 2008/0130941 A1* | 6/2008 | Araki | G10L 19/018 382/100 |
| 2009/0234854 A1 | 9/2009 | Kanda et al. | |
| 2009/0276788 A1 | 11/2009 | Homma | |
| 2010/0211693 A1* | 8/2010 | Master et al. | 709/238 |
| 2011/0173208 A1 | 7/2011 | Vogel | |
| 2011/0289114 A1* | 11/2011 | Yu et al. | 707/769 |
| 2012/0275764 A1* | 11/2012 | Eyer | 386/241 |
| 2013/0198768 A1* | 8/2013 | Kitazato | 725/19 |

FOREIGN PATENT DOCUMENTS

| | | |
|---|---|---|
| JP | 2003256309 | 9/2003 |
| JP | 2004-511838 A | 4/2004 |
| JP | 2006-527425 A | 11/2006 |
| JP | 2007-48212 A | 2/2007 |
| JP | 2009-216986 A | 9/2009 |
| JP | 2010-161434 A | 7/2010 |

OTHER PUBLICATIONS

Combined Chinese Office Action and Search Report dated Nov. 2, 2016 in patent application No. 201280055207.8 with English translation.

* cited by examiner

INFORMATION PROCESSING DEVICE, INFORMATION PROCESSING METHOD, INFORMATION PROVISION DEVICE, AND INFORMATION PROVISION SYSTEM

TECHNICAL FIELD

The technology disclosed in the present specification relates to an information processing device and an information processing method that extract feature point information from content for automatic content recognition, an information provision device that provides information of the content based on the feature point information extracted from the content, and an information provision system that provides the information of the content based on the feature point information extracted from the content.

BACKGROUND ART

In recent years, technologies for recognizing and understanding images and sounds have been developed, and a variety of applications of consumer appliances have used such various technologies for recognizing and understanding images and sounds. As an example, ACR (Automatic Content Recognition) constructed in a client server system using the Internet is exemplified, which is called an ACR service, and various applications have been proposed.

As one application of the ACR service, content right restriction such as detecting illegal copies can be exemplified. When content is distributed through the Internet, for example, the content is identified so that whether the content is legitimate is checked using such a recognition and understanding technology. Recently, according to the proliferation of file sharing services, a need to more accurately identify content using images and sounds has increased.

In addition, as another application of the ACR service, a service of providing users who view content with added values can be exemplified. For example, broadcasted or distributed content is identified and information relating to the content is provided through the Internet so as to be synchronized with viewing of the content. The CDDB music identification service provided by Gracenote of the US (Gracenote, Inc., Berkeley, Calif.) identifies a compact disc (CD) and provides access to information relating to the identified CD (the album title, artist name, track list, relevant content on the Internet (the album cover, artist, fan site), and the like).

In the ACR service, a watermark (electronic watermark) or a fingerprint (feature point information) is extracted from content and the content is identified in, for example, the final stage in which the content is decoded and displayed, and the service does not rely on a delivery chain of the content.

When content that includes video information and audio information of a broadcasting program or the like is identified, a method of identifying the content using only one of the video information and the audio information and a method of identifying the content using both pieces of the information are considered.

For example, as a method of identifying content using only audio information, a method has been proposed in which one or more segments of a waveform that has been digitally sampled are used to form an amplitude signature of the waveform by counting the number of times of occurrence in the segment of the waveform in each of a plurality of amplitude bands or slots, fuzzy comparison with amplitude signatures in a database is executed, and when one or more potential matching cases are found, more precise comparison is executed, and thereby matching of waveforms is found in a recorded database indicating the waveforms (for example, refer to Patent Literature 1).

Whether only one of video information and audio information is used or both pieces of the information are used when content should be identified is defined as a part of service specifications or application specifications during system designing according to an intended application of the ACR service, an index of a content recognition rate, system design and restriction on operation costs, and the like.

At present, realizing the ACR service using only audio information is considered to be most advantageous to lessening loads on an amount of information and a number of processes to be dealt with in light of system design and operation costs. This is because there are many cases in which such audio information may have a smaller data amount of feature point information for identifying content than video information.

However, as there are a larger number of pieces of content to be dealt with, a data amount of feature point information to be prepared on a server side of the ACR service increases even though a data amount of feature point information of each piece of content is small. An increasing physical capacity of a database in the ACR service that deals with audio information is a challenging task in terms of system design and operations.

With regard to the task in terms of system design, if the number of pieces of content to be dealt with increases, a capacity of a database in which feature point information for identifying the content is stored increases, and a process for the identification and a time taken in the identification increase as well. In addition, with regard to the task in terms of a system operation, if the number of pieces of content to be dealt with increases, a capacity of a database in which feature point information for identifying the content is stored increases, and investment in facilities for preparing physical databases, maintenance expenses and the like increase. The present inventors consider it necessary to take measures for such tasks even when only audio information is used.

CITATION LIST

Patent Literature

Patent Literature 1: JP 2004-511838T

SUMMARY OF INVENTION

Technical Problem

An object of the technology disclosed in the present specification is to provide an excellent information processing device and information processing method that enable appropriate extraction of feature point information from content that includes audio information so that burdens of system design and operation imposed on a server side of the ACR service are reduced.

Another object of technology disclosed in the present specification is to provide an excellent information provision device that can appropriately provide information of content based on feature point information extracted from audio information of the content so that burdens of system design and operation are lessened.

In addition, still another object of the technology disclosed in the present specification is to provide an excellent information provision system that can appropriately provide information of content based on feature point information extracted from audio information of the content so that burdens of system design and operation imposed on a server side of the ACR service are reduced.

Solution to Problem

According to the first aspect of the present application in order to achieve the above-mentioned object, there is provided an information processing device configured to realize an audio ACR function only with main sound data, the device including an input unit to which content configured to include a main sound and one or more sub sounds is input, a sound output unit configured to output a sound by decoding and reproducing either of the main sound or one or more sub sounds included in the input content, and a feature point information generation unit configured to generate feature point information from the main sound included in the input content.

According to a second aspect of the present application, the feature point information generation unit of the information processing device described in the first aspect is configured to execute a process of generating the feature point information when an automatic content recognition operation is performed, and to recognize the main and sub sounds thereby being able to generate feature point information of the main sound at all times even when the sub sounds are listened to.

According to a third aspect of the present application, when the sound output unit for viewing and listening outputs a sound by decoding and reproducing the sub sounds, the feature point information generation unit of the information processing device described in the first aspect is configured to decode and reproduce the main sound when an automatic content recognition operation is performed, thereby generating the feature point information with regard to a decoding result of the main sound. In other words, the information processing device is characterized to start decoding and reproduction of the main sound taking the automatic content recognition operation as an opportunity, and therefore it is not necessary to simultaneously reproduce the main and sub sounds at all times.

According to a fourth aspect of the present application, the information processing device described in the third aspect is configured to generate the feature point information from the decoded and reproduced main sound at the time of listening to the sub sounds, and not to be output the main sound.

According to a fifth aspect of the present application, the content input to the input unit is multiplexed with an image. In addition, the information processing device described in the first aspect is configured to further include a demultiplexer unit configured to demultiplex the input content, the demultiplexer unit performs a process targeting all sounds included in the content, the sound output unit only decodes and reproduces a sound signal to be listened to among the demultiplexed main sound and one or more sub sounds and then outputs a sound, and, when an automatic content recognition operation is performed when the sub sounds are listened to, the feature point information generation unit decodes and reproduces the demultiplexed main sound, and then generates the feature point information with regard to a decoding result of the main sound. In other words, the information processing device is characterized to only decode either sound signal to be listened to among main and sub signals, and when the sub sounds are listened to, decoding and the reproduction of the main sound start taking the automatic content recognition operation as an opportunity, and it is not necessary to simultaneously reproduce the main and sub sounds at all times.

According to a sixth aspect of the present application, the information processing device according to the first aspect further includes a content identification unit configured to identify the input content based on the feature point information generated from the main sound by the feature point information generation unit.

According to a seventh aspect of the present application, the information processing device according to the sixth aspect further includes a communication interface unit configured to be connected to a network, and the content identification unit is configured to check a reference feature point information database in which content identification information is associated with the feature point information of the main sound included in the content via the communication interface unit, thereby acquiring the content identification information.

According to an eighth aspect of the present application, the information processing device according to the seventh aspect further includes a relevant information acquisition unit configured to acquire relevant information of the content identified by the content identification unit by checking a relevant information database in which relevant information of each piece of content is stored via the communication interface unit.

In addition, according to a ninth aspect of the present application, there is provided an information processing method including the steps of inputting content configured to include a main sound and one or more sub sounds, outputting a sound by decoding and reproducing either of the main sound and one or more sub sounds included in the input content, and generating feature point information from the main sound included in the input content.

In addition, according to a tenth aspect of the present application, there is provided an information provision device configured to include a reference feature point information database in which feature point information generated from a main sound of content configured to include the main sound and one or more sub sounds is associated with content identification information and to return the content identification information in response to an inquiry configured to include the feature point information, and the feature point information only of the main sound is compiled as a database, and a capacity of the database is minimized by only using the main sound when the feature point information of the content is checked.

In addition, according to an eleventh aspect of the present application, there is provided an information provision system configured to include a content distribution device configured to distribute content configured to include a main sound and one or more sub sounds, a client device configured to be used in viewing and listening to the content distributed from the content distribution device with any of audio channels and to generate feature point information from the main sound, and an information provision server configured to include a reference feature point information database in which the feature point information generated from the main sound of the content is associated with content identification information and to provide the content identification information corresponding to an inquiry of the feature point information from the client device.

However, the "system" mentioned here means a logical set of a plurality of devices (or functional modules that realize specific functions) and whether each device or functional module is disposed in a single housing does not particularly matter.

Advantageous Effects of Invention

According to the technology disclosed in the present specification, it is possible to provide an excellent information processing device and information processing method that can reduce burdens in terms of system design and operation imposed on a server of an ACR service by extracting feature point information only from a main sound out of audio information of content.

In addition, according to the technology disclosed in the present specification, it is possible to provide an excellent information provision device that can lessen burdens of system design and operation by providing information of content based only on feature point information extracted from a main sound out of audio information of the content.

Furthermore, according to the technology disclosed in the present specification, it is possible to provide an excellent information provision system that can reduce burdens of system design and operation imposed on a server of an ACR service by providing information of content based only on feature point information extracted from a main sound out of audio information of the content.

Other aims, characteristics, and advantages of the technique disclosed in the present specification will be made clear by a more detailed description based on embodiments and attached drawings which will be described later.

DESCRIPTION OF EMBODIMENT

Hereinafter, an embodiment of the technology disclosed in the present specification will be described in detail with reference to the drawings.

Figure 1:
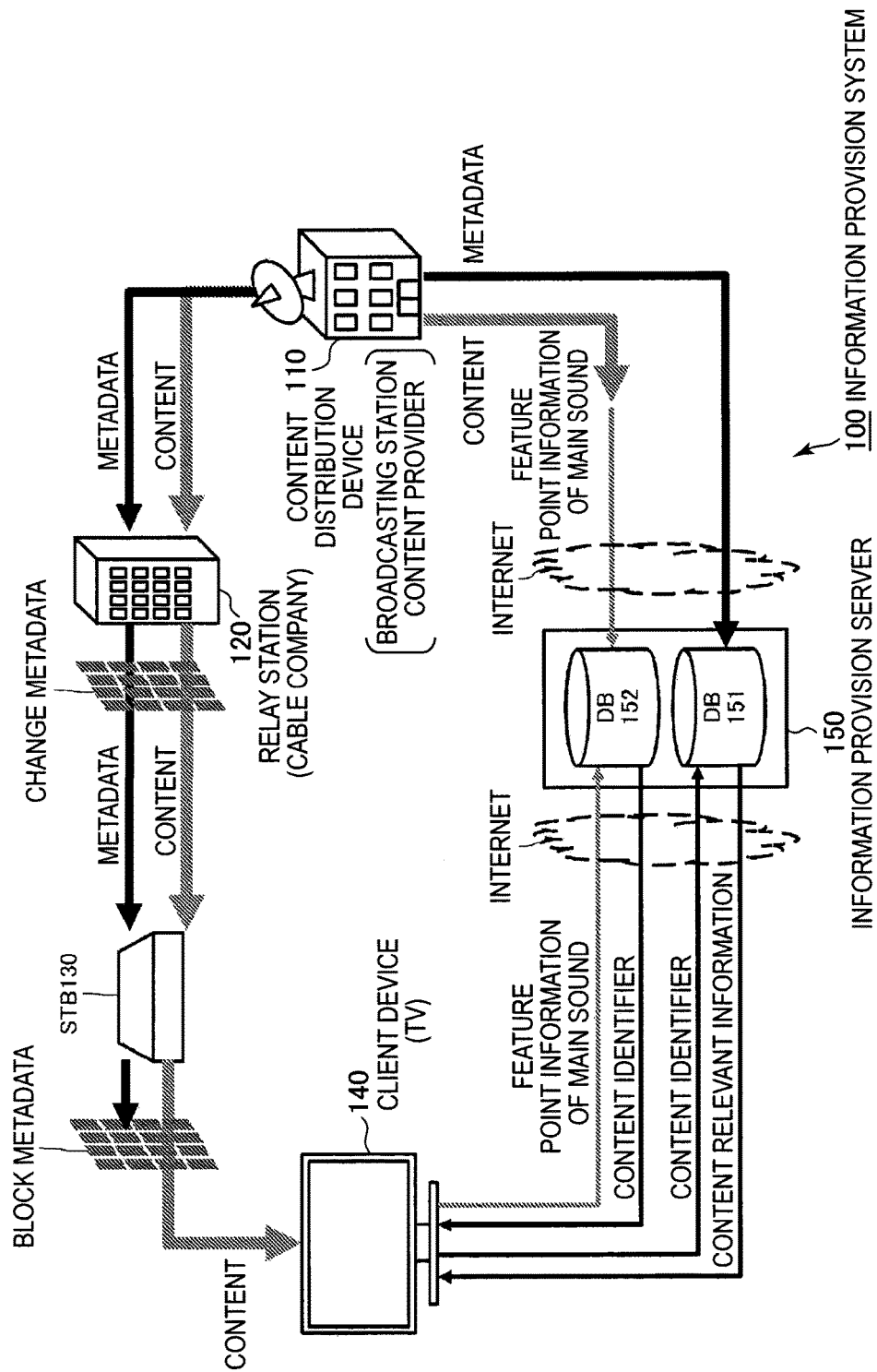
FIG. 1 is a diagram illustrating a configuration of an information provision system 100 that provides added value information relating to content in synchronization with viewing.

FIG. 1 shows, as an example of an ACR service, a configuration of an information provision system 100 that provides a user who views content with added value information relating to the content in synchronization with viewing. The information provision system 100 shown in the drawing is configured with a content distribution device 110 that distributes broadcasting content, a client device 140 such as a TV receiver set with which a user views the distributed content, and an information provision server 150 that provides added information relating to the content.

The content distribution device 110 is operated by a broadcasting station, a content provider, or the like and distributes content in the form of a cable, a satellite, an IPTV, or the like. The content includes video information and audio information, but there are cases of content which has one or more sub sounds in addition to a main sound as the audio information. In addition, along with current digitalization of broadcasting, and the like, metadata that includes relevant application distribution control information and the like is distributed at the same time as content. Such metadata includes content identifiers and the like. When original metadata arrives at the client device 140, the ACR service can be realized by extracting a content identifier from the metadata.

Content distributed (or broadcasted) from the content distribution device 110 that is managed by a broadcasting station, a content provider, or the like is not limited to being directly received by the client device 140 such as a TV receiver set or the like, and there are also cases in which content is first received by a broadcast relay station 120 such as a cable company of each region and then redistributed. It can also be assumed that there are a plurality of broadcasting relay stations engaged therein. The broadcast relay station 120 may distribute content with a time interval from the original broadcasting time slot, or change composition of programs. For this reason, when the broadcast relay station 120 redistributes broadcasting content, the original metadata distributed from the content distribution device 110 may be changed, or replaced by exclusive metadata of the broadcast relay station 120. According to the change or replacement of metadata described above, there are cases in which some or all information included in the original metadata such as content identifiers is lost. After the metadata is lost, an attribute of the content is unclear.

As described above, the broadcasting content distributed from the content distribution device 110 or the broadcast relay station 120 arrives at each household together with the metadata. However, the content is not limited to being directly received by the client device 140 such as a TV receiver set, and as illustrated in the drawing, there are cases of content being first received by a dedicated set-top box (STB) 130 for cable or satellite broadcasting, or an IPTV. The set-top box 130 generally separates the received broadcast content into a content main body, which is composed of video information and audio information, and metadata, and transmits the content main body to the client device 140 such as a TV receiver set via an RF (Radio Frequency) cable, or the like.

In short, the information provision system 100 illustrated in FIG. 1 is a use case in which the metadata from a broadcasting station is blocked by the broadcast relay station 120 such as a cable company or a set-top box 130. In such a case, the client device 140 is not able to identify content being viewed from a content identifier included in the metadata. Therefore, in the information provision system 100 according to the present embodiment, in order to realize the ACR service, feature point information extracted from video information or audio information constituting content is used to identify the content, instead of a content identifier.

The content distribution device 110 operated by a broadcasting station, a content provider, or the like transmits metadata attached to distributed content to the information provision server 150 via, for example, the Internet. In addition, the content distribution device 110 extracts feature point information for each piece of the distributed content, and transmits the information to the information provision server 150 via the Internet, or the like.

The information provision server 150 has a metadata database 151 in which metadata is stored, and a reference feature point information database 152 in which feature point information of each piece of content is stored. The metadata database 151 manages metadata of each piece of content, advertisements relating to the content, applications linked to programs, and the like in association with content identifiers. In addition, the reference feature point information database 152 manages feature point information of each piece of content in association with content identifiers.

On the other hand, if feature point information is extracted from content that a user has viewed on the client device 140 side such as a TV receiver set, the client device makes an inquiry to the information provision server 150 via the Internet or the like.

In response to the inquiry from the client device 140 on the feature point information, the information provision server 150 checks the reference feature point information database 152 to return a corresponding content identifier to the client device 140 as a checking result. In this manner, the client device 140 can ascertain an attribute of the content that has lost metadata.

When the client device 140 obtains the content identifier as the checking result, the client device further makes an inquiry to the information provision server 150 based on the content identifier. Then, in response to the inquiry of the content identifier, the information provision server 150 checks the metadata database 151 to provide a user with metadata of the content, an advertisement relating to the content, an application linked to the program, and the like. As a provision method, the data may be distributed to a mobile device such as a smartphone associated with the client device 140, in addition to being directly transmitted to the client device 140.

As described above, when content is identified based on feature point information extracted from the content, instead of a content identifier, to realize the ACR service, a method of identifying the content using only one of video information and audio information and a method of identifying the content using both pieces of the information are considered. In the present embodiment, the ACR service is set to be realized using only audio information in view of system design and operation costs. This is because audio information is considered to be most advantageous in lessening a load of an information amount and a process amount to be dealt with than video information since a data amount of feature point information of audio information for identifying content may be small.

However, as the number of pieces of content to be dealt with increases, a data amount of feature point information to be prepared in a server of the ACR service increases. An increasing physical capacity of a database of the ACR service that deals with audio information is a challenging task in terms of system design and operations.

With regard to the task in terms of system design, if the number of pieces of content to be dealt with increases, a capacity of the reference feature point information database 152 in which feature point information for identifying the content is stored increases, and a process for the identification and a time taken in the identification increase as well. In addition, with regard to the task in terms of a system operation, if the number of pieces of content to be dealt with increases, a capacity of the reference feature point information database 152 increases, and investment in facilities for preparing physical databases, maintenance expenses and the like increase.

Here, a case in which feature point information of content that has a plurality of pieces of audio information such as a main sound and a sub sound is extracted will be considered. If the ACR service is operated during viewing of the client device 140 listening to a sub sound rather than a main sound, feature point information is extracted from the sub sound, and the client device makes an inquiry to the information provision server 150. In this case, in order to identify the content, it is necessary for the information provision server 150 to prepare the feature point information not only of the main sound but also of the sub sound in the reference feature point information database 152, and thus it is difficult to solve the above-mentioned task of reducing the capacity of the database. In addition, if only the feature point information of the main sound is prepared in the reference feature point information database 152, the ACR service may not function when the sub sound is listened to in the client device 140.

Thus, in the present embodiment, the ACR service is designed to function normally during the listening of the sub sound even if the information provision server 150 has not prepared the feature point information of the sub sound by extracting only the feature point information of the main sound and making an inquiry to the information provision server 150 even when the sub sound is listened to in the client device 140. In addition, even when content that has a main sound and a plurality of pieces of audio information is distributed from the content distribution device 110, the client device 140 makes an inquiry on feature point information extracted from the main sound, and thus it is not necessary for the information provision server 150 to prepare feature point information of sub sounds, and the capacity of the database may not increase.

Figure 2:
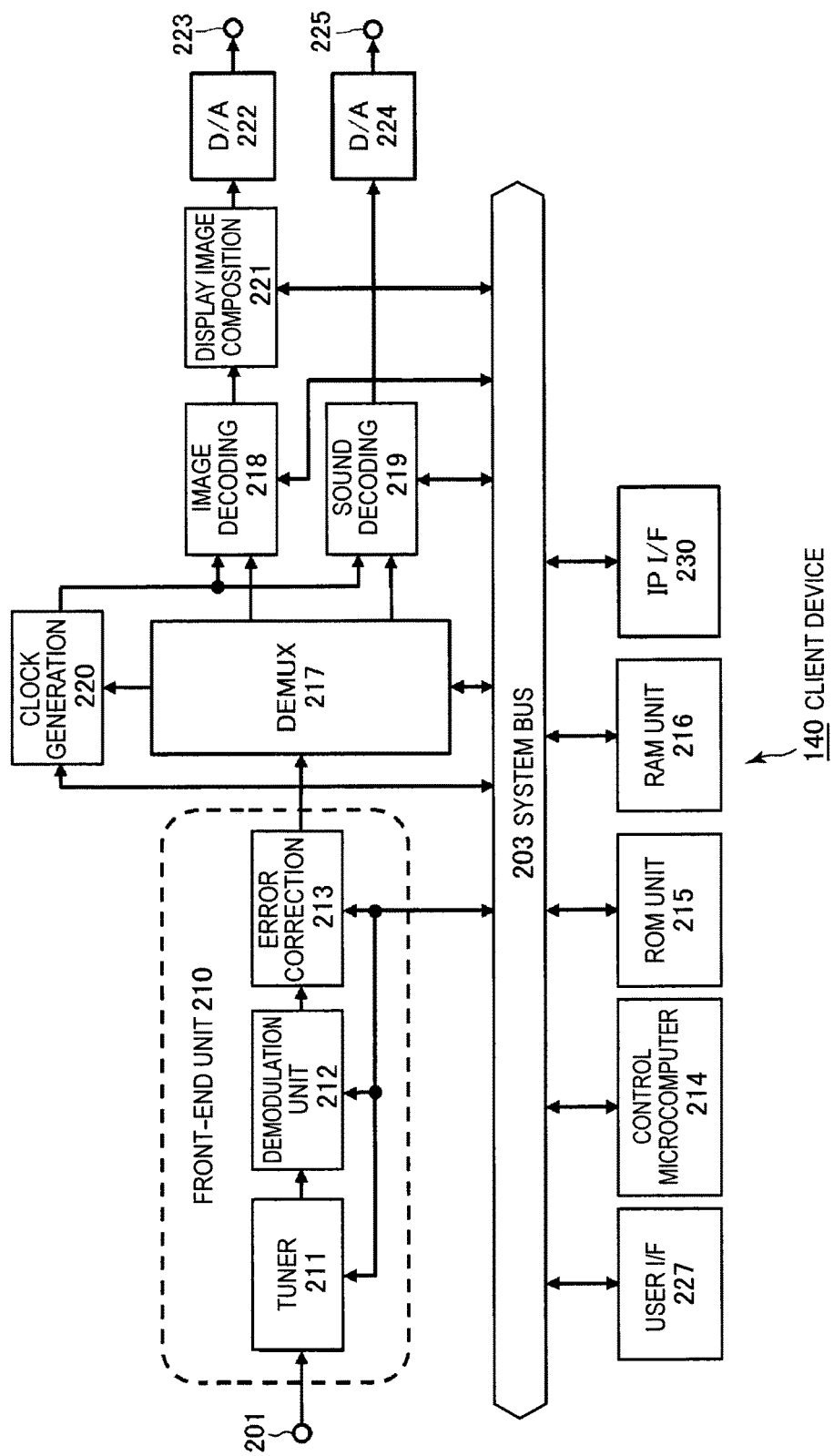
FIG. 2 is a diagram illustrating a configuration example of a client device 140.

FIG. 2 shows a configuration example of the client device 140.

An input modulation (RF) signal input from a parabolic antenna, a cable line, an STB (none of which is shown in the drawing), or the like is supplied from an input terminal 201 as an input to a tuner unit 211 in a front-end unit 210, and selected. A demodulation unit 212 performs, for example, QPSK (Quadrature Phase Shift Keying) demodulation. An output from the demodulation unit 212 is supplied to an error detection and correction unit 213. The error detection and correction unit 213 performs a correction process at the same time as an error is detected as much as possible.

Keys necessary for decrypting codes are stored in a control microcomputer unit 214, a ROM (Read Only Memory) unit 215, a RAM (Random Access Memory) unit 216, and the like together with a decryption program. When a digital signal that has been transmitted is coded, a key for decrypting the code and a decryption process are necessary. Thus, the control microcomputer unit 214 reads a key to decrypt the code from the ROM unit 215, the RAM unit 216, and the like, and then supplies the key to a demultiplexer unit (DEMUX) 217.

Using the key, the demultiplexer unit 217 decrypts the coded digital signal. Note that, together with the key necessary for the decryption, the decryption program, charge information, and the like are also stored in the memories.

The demultiplexer unit 217 receives the output signal from the error detection and correction unit 213, and then stores the output signal in a proper memory region of the RAM unit 216 for a data buffer memory (or in a memory region inside the demultiplexer unit 217). Then, data is appropriately read from the RAM unit 216 then separated into a video elementary stream and an audio elementary stream, and then the video elementary stream is supplied to an image decoding unit 218 and the audio elementary stream is supplied to a sound decoding unit 219. At this moment, information necessary for re-forming a system clock is extracted from a multiplexed encoded data stream by a clock generation unit 220, and then used in processes of the image decoding unit 218 and the sound decoding unit 219.

When the content has a plurality of audio channels, the audio elementary stream extracted by the demultiplexer unit 217 is extracted according to the amount. For example, when there are main and sub audio channels, two elementary streams are extracted by the demultiplexer unit 217.

It should be noted that the process of the demultiplexer unit 217 is prescribed in detail in, for example, the written standard of ISO (International Organization for Standardization)/IEC (International Electrotechnical Commission) 13818-1 (Geneva, 1995).

The image decoding unit 218 appropriately stores the input encoded data in the RAM unit 216, and executes a decoding process of an image signal that has been compressed-encoded in the form of MPEG (Moving Picture Experts Group). The process of the image decoding unit 218 is prescribed in detail in, for example, the written standard of ISO/IEC 13818-2 (Geneva, 1995). The decoded image signal is supplied to a display image composition unit 221. In the display image composition unit 221, the signal is converted into, for example, a luminance signal (Y), a chroma signal (C), and a composite signal (CV) in an NTSC (National Television System Committee) system. Then, the signals are converted into analog signals by a D/A converter unit 222, and then output. A video signal is output from an output terminal 223 in the form of, for example, an S video signal.

The sound decoding unit 219 causes the RAM unit 216 to appropriately store the encoded sound signal supplied from the demultiplexer unit 217, and executes a decoding process of the sound signal that has been compressed and encoded in the form of MPEG. The process of the sound decoding unit 219 is prescribed in detail in, for example, the written standard of ISO/IEC 13818-3 (Geneva, 1995). The decoded digital sound signal is supplied to a D/A converter unit 224 to be converted into an analog signal. At this moment, the sound signal of the right and left channels is properly processed, and then output from an output terminal 225 as a sound output of the right and left channels.

When the content has a plurality of audio channels, the demultiplexer unit 217 extracts a plurality of audio elementary streams (as described above), and the sound decoding unit 219 is provided with decoding sections for each of the audio channels.

The control microcomputer unit 214 executes various processes according to the program stored in the ROM unit 215. For example, the control microcomputer unit controls processes performed in, for example, the tuner unit 211, the demodulation unit 212, the error detection and correction unit 213, and the like via a system bus 203. In addition, the control microcomputer unit controls processing blocks of the demultiplexer unit 217, the image decoding unit 218, the sound decoding unit 219, and the display image composition unit 221 via the system bus 203, and controls reading and writing processes and the like of each memory address performed on the ROM unit 215 and the RAM unit 216. On the other hand, the control microcomputer unit 214 can directly receive an input of a predetermined command from a user interface unit 227 that receives input information from a remote commander (not shown in the drawing), or the like. The user interface unit 227 inputs instructions for tuning and adjusting volume, selecting an audio channel, operating the ACR function, and the like.

An IP (Internet Protocol) interface (IP I/F) unit 230 causes the client device 140 to be connected to a broadband network such as the Internet through a wide-area network such as Ethernet (a registered trademark), Wi-Fi, or the like. The IP interface unit 230 is connected to the information provision server 150 at the time of, for example, activation of the ACR service, to be used in transmitting feature point information extracted from content or acquiring metadata relating to the content.

Figure 3:
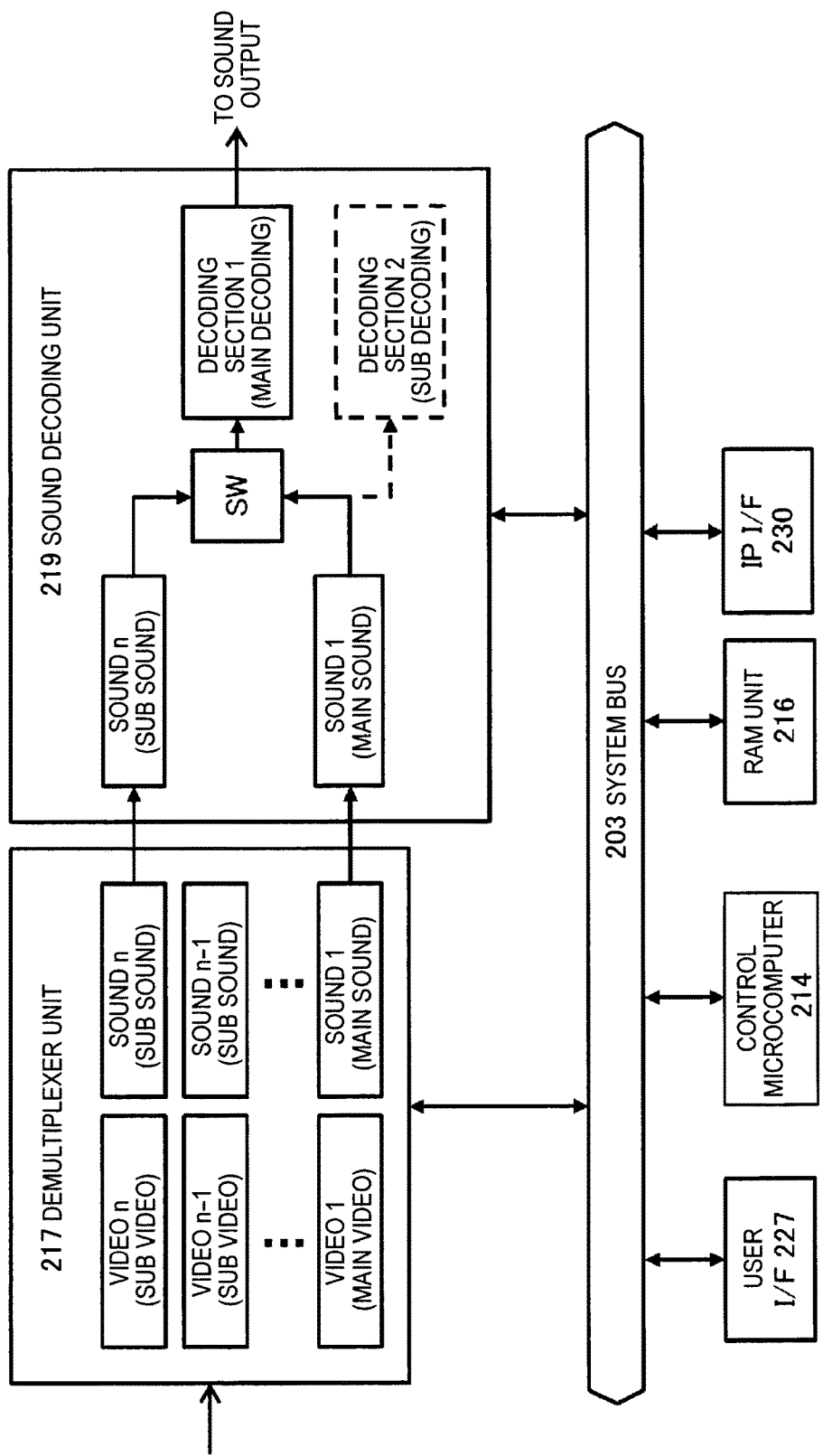
FIG. 3 is a diagram schematically illustrating an internal configuration of a demultiplexer unit 217 and a sound decoding unit 219 corresponding to content that includes a plurality of audio channels.

FIG. 3 schematically illustrates an internal configuration of the demultiplexer unit 217 and the sound decoding unit 219 corresponding to content that includes a plurality of audio channels. As described above, when content input to the client device 140 has a plurality of audio channels, the demultiplexer unit 217 extracts audio elementary streams according to the amount. In addition, the sound decoding unit 219 is provided with the decoding sections for each of the audio channels. Furthermore, when the content that has the plurality of audio channels is viewed and listened to, switching of the audio channels which are targets to view and listen to is input to the control microcomputer unit 214 from the user interface unit 227.

In the present embodiment, for the purpose of low power consumption of the client device 140 and speed-up of an ACR operation, a decoding process is performed targeting both of main and sub audio channels up until the demultiplexer unit 217, but the decoding process is performed by the sound decoding unit 219 only on any one audio channel that is a target to be listened to, using an internal switching (SW) function. It is assumed that, for example, identification information for identifying a main or sub sound is given to the data of each audio channel, and thereby determination of whether data is of a main sound or a sub sound can be made during decoding.

In this state, when an instruction of an operation of an ACR function is input from the user interface unit 227, the sound decoding unit 219 executes a process of acquiring feature point information of the main sound on data of a decoding result of a desired audio channel that has been stored in the RAM unit 216 by the demultiplexer unit 217 under control of the control microcomputer unit 214.

Then, the client device 140 makes an inquiry of the acquired feature point information of the main sound to the information provision server 150 via the Internet or the like from the IP interface unit 230.

The information provision server 150 manages at least the feature point information of the main sound of the content distributed from the content distribution device 110 in the reference feature point information database 152 in association with content identifiers. When the content is identified by checking the reference feature point information database 152 in response to the inquiry of the feature point information of the main sound from the client device 140, the information provision server 150 returns a corresponding content identifier as a checking result to the client device 140.

When the client device 140 obtains the content identifier as the checking result, the client device further makes an inquiry to the information provision server 150 based on the content identifier. Then, in response to the inquiry of the content identifier, the information provision server 150 checks the metadata database 151 to provide a user with metadata of the content, an advertisement relating to the content, an application linked to a program, and the like.

It should be noted that, using the content identifier by checking the reference feature point information database 152, the information provision server 150 may acquire the metadata by further checking the metadata database 151 and then return the metadata to the client device 140 as the checked result, rather than returning the content identifier to the client device 140.

The client device 140 stores, first in the RAM unit 216, the metadata, the advertisement relating to the content, the application linked to the program, and the like received from the information provision server 150 via the IP interface unit 230.

The control microcomputer unit 214 processes the metadata, the advertisement relating to the content, the application linked to the program, and the like which have been stored in the RAM unit 216 according to application specifications.

As a method of providing the metadata, and the like from the information provision server 150, the metadata may be distributed to a mobile device associated with the client device 140 such as a smartphone, in addition to being transmitted directly to the client device 140.

Figure 4:
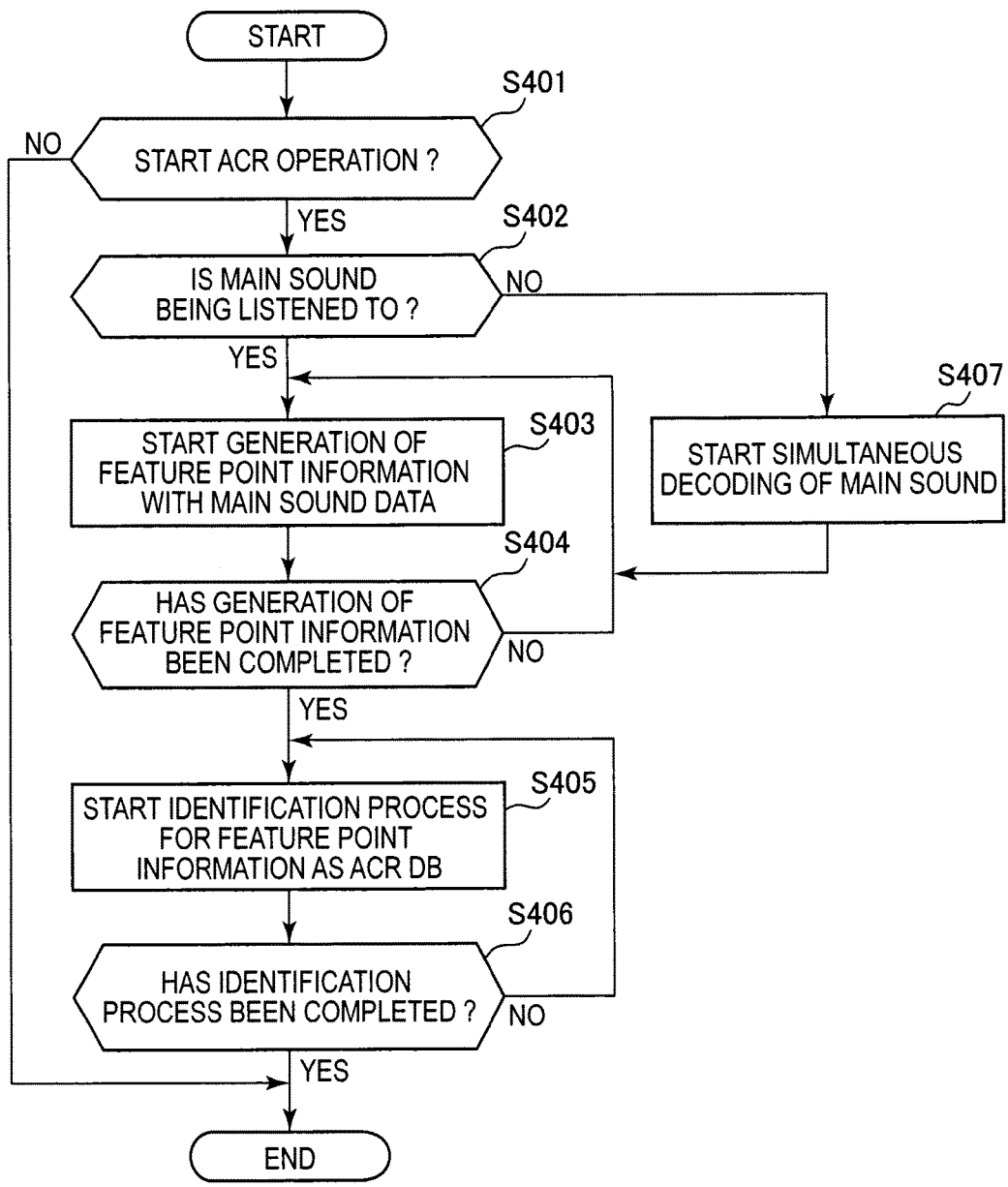
FIG. 4 is a flowchart showing a processing procedure for performing an operation of an ACR function under control of a control microcomputer unit 214.

FIG. 4 shows a processing procedure for performing the operation of the ACR function under control of the control microcomputer unit 214 in the form of a flowchart.

When a start of the ACR operation is instructed by the user interface unit 227, or the like (Yes in Step S401) while viewing and listening of content are performed in the client device 140, the control microcomputer unit 214 checks whether a main sound is being listened to (Step S402).

Here, when the main sound is not being listened to, in other words, a sub sound is being listened to (No in Step S402), the sound decoding unit 219 starts decoding of a main sound channel that has been stored in the RAM unit 216 by the demultiplexer unit 217 (Step S407). In addition, when the main sound is being listened to (Yes in Step S402), the sound decoding unit 219 performs decoding of the main sound channel that is a listening target.

Then, the control microcomputer unit 214 starts a process of acquiring feature point information on decoding result data of the main sound channel (Step S403).

When creation of the feature point information of the main sound is completed (Yes in Step S404), the content being viewed and listened to is identified based on the feature point information under control of the control microcomputer unit 214 (Step S405). To be specific, an inquiry on the acquired feature point information of the main sound is made to the information provision server 150 via the Internet, or the like from the IP interface unit 230.

The information provision server 150 manages at least the feature point information of the main sound of the content distributed from the content distribution device 110 in the reference feature point information database 152 in association with content identifiers. In response to the inquiry on the feature point information of the main sound from the client device 140, the information provision server 150 checks the reference feature point information database 152. When the client device receives a checked result from the information provision server 150 and thereby can identify the content (Yes in Step S406), the present process routine ends.

When the client device can extract the feature point information only from an audio channel being listened to, there are cases in which an audio ACR function does not work with regard to the content that includes a plurality of audio channels even though the client device is in cooperation with the information provision server that has prepared only the feature point information of the main sound in the database while the sub sound is listened to on the client device side. On the other hand, in the present embodiment, the client device 140 can reliably generate the feature point information of the main sound regardless of what audio channel is being listened to, and thus the audio ACR function can be realized in cooperation with the information provision server that has only prepared the feature point information of the main sound in the database.

In addition, since it is better for the information provision server 150 to operate a database only for the feature point information of the main sound with regard to such content that includes a plurality of audio channels, the capacity of the database can be suppressed to the minimum level, and accordingly, the optimum information provision system 100 in terms of operation efficiency, operation costs, maintenance costs, and the like can be realized.

Additionally, the present technology may also be configured as below.

(1) An information processing device including:
an input unit to which content including a main sound and one or more sub sounds is input;
a sound output unit configured to output a sound by decoding and reproducing either the main sound or the one or more sub sounds included in the input content; and
a feature point information generation unit configured to generate feature point information from the main sound included in the input content.

(2) The information processing device according to (1), wherein the feature point information generation unit executes a process of generating the feature point information when an automatic content recognition operation is performed.

(3) The information processing device according to (1), wherein, when the sound output unit for viewing and listening outputs a sound by decoding and reproducing the sub sounds, the feature point information generation unit decodes and reproduces the main sound when an automatic content recognition operation is performed, thereby generating the feature point information with regard to a decoding result of the main sound.

(4) The information processing device according to (3), wherein the decoded and reproduced main sound is not output as a sound.

(5) The information processing device according to (1), wherein the content input to the input unit is multiplexed with an image,
wherein the information processing device further including:
a demultiplexer unit configured to demultiplex the input content,
wherein the demultiplexer unit performs a process targeting all sounds included in the content,
wherein the sound output unit outputs a sound by decoding and reproducing only a sound signal to be viewed and listened to among the demultiplexed main sound and one or more sub sounds, and
wherein, when an automatic content recognition operation is performed when the sub sounds are viewed and listened to, the feature point information generation unit decodes and reproduces the demultiplexed main sound, and generates the feature point information with regard to a decoding result of the main sound.

(6) The information processing device according to (1), further including:
a content identification unit configured to identify the input content based on the feature point information generated from the main sound by the feature point information generation unit.

(7) The information processing device according to (6), further including:
a communication interface unit configured to be connected to a network,
wherein the content identification unit checks a reference feature point information database in which content identification information is associated with the feature point information of the main sound included in the content via the communication interface unit, thereby acquiring the content identification information.

(8) The information processing device according to (7), further including:

a relevant information acquisition unit configured to acquire relevant information of the content identified by the content identification unit by checking a relevant information database in which relevant information of each piece of content is stored via the communication interface unit.

(9) An information processing method including the steps of:

inputting content including a main sound and one or more sub sounds;

outputting a sound by decoding and reproducing either the main sound or the one or more sub sounds included in the input content; and generating feature point information from the main sound included in the input content.

(10) An information provision device including:

a reference feature point information database in which the feature point information generated from a main sound of content including the main sound and one or more sub sounds is associated with content identification information, wherein the content identification information is returned in response to an inquiry including feature point information.

(11) An information provision system including:

a content distribution device configured to distribute content including a main sound and one or more sub sounds;

a client device configured to be used in viewing and listening to the content distributed from the content distribution device with any of audio channels, and to generate feature point information from the main sound; and an information provision server configured to include a reference feature point information database in which the feature point information generated from the main sound of the content is associated with content identification information, and to provide the content identification information corresponding to an inquiry of the feature point information from the client device.

INDUSTRIAL APPLICABILITY

It should be understood by those skilled in the art that various modifications, combinations, sub-combinations and alterations may occur depending on design requirements and other factors insofar as they are within the scope of the appended claims or the equivalents thereof.

The technology disclosed in the present specification exhibits a main characteristic in a process of generating feature point information from content that includes a plurality of audio channels and identifying the content based on the feature point information, and the succeeding processes to the identification of the content are not particularly limited. Although description in the present specification focused on an embodiment of the information provision system that distributes metadata of content, an advertisement relating to the content, an application linked to a program, and the like to a client such as a TV receiver set or a mobile device such as a smartphone, the technology disclosed in the present specification can be used in various services which use the ACR function such as content right control.

In short, the present invention has been disclosed in a form of illustration and should not be interpreted limitedly. To determine the gist of the technology disclosed in the present embodiment, patent claims should be taken into account.

REFERENCE SIGNS LIST 100 information provision system
110 content distribution device
120 relay station
130 set-top box
140 client device
150 information provision server
151 metadata database
152 reference feature point information database
201 input terminal
203 system bus
210 front-end unit
211 tuner unit
212 demodulation unit
213 error detection and correction unit
214 control microcomputer unit
215 ROM unit
216 RAM unit
217 demultiplexer unit
218 image decoding unit
219 sound decoding unit
220 clock generation unit
221 display image composition unit
222 D/A converter unit
223 output terminal
224 D/A converter unit
225 output terminal
227 user interface unit
230 IP interface unit

The invention claimed is:

1. An information processing device comprising:
circuitry to
receive input content including a main sound stream and a sub sound stream;
output a sound by separately decoding and reproducing either the main sound stream or the sub sound stream included in the input content; and
generate feature point information from the main sound stream irrespective of whether the main sound stream is decoded and reproduced to output the sound, wherein
when an automatic content recognition operation is performed while the sound being output is not from the main sound stream, the circuitry decodes the main sound stream and generates the feature point information to be used in the automatic content recognition operation from a decoding result of the main sound stream,
the circuitry further identifies the input content based on the feature point information generated from the main sound stream, and
the circuitry is further connected to a network, and checks a reference feature point information database in which content identification information is associated with the feature point information of the main sound stream included in the content, thereby acquiring the content identification information.

2. The information processing device according to claim 1, wherein the circuitry generates the feature point information when the automatic content recognition operation is performed irrespective of which one of the main sound stream and the sub sounds stream is decoded and reproduced to output the sound.

3. The information processing device according to claim 1, wherein
the content input to the circuitry is multiplexed with an image, and
the circuitry further
demultiplexes the input content,
performs a process targeting all sound streams, including the main sound stream and the sub sound stream, included in the content,
outputs the sound by decoding and reproducing only the sound stream to be listened to among the demultiplexed main sound stream and the sub sound stream, and
decodes the demultiplexed main sound stream and generates the feature point information from the decoding result of the main sound stream, when the automatic content recognition operation is performed when the sub sound stream is listened to.

4. The information processing device according to claim 1, wherein the circuitry further acquires relevant information of the content by checking a relevant information database in which relevant information of each piece of content is stored.

5. The information processing device according to claim 1, wherein
the main sound stream and the sub sound stream are represented by two separate elementary streams extracted by a demultiplexer.

6. The information processing device according to claim 1, wherein the circuitry receives from a server, metadata associated with the input content upon transmitting the generated feature point information to the server.

7. The information processing device according to claim 1, wherein the circuitry generates the feature point information from only the main sound stream irrespective of which one of the main sound stream and the sub sound stream is decoded and reproduced to output the sound.

8. The information processing device according to claim 1, wherein the sound is output by separately decoding and reproducing only one of the main sound stream and the sub sound stream.

9. The information processing device according to claim 1, wherein the automatic content recognition operation identifies the input content based on the feature point information generated from the main sound stream.

10. An information processing method comprising:
receiving input content including a main sound stream and a sub sound stream;
outputting a sound by separately decoding and reproducing either the main sound stream or the sub sound stream included in the input content; and
generating, by circuitry of an information processing device, feature point information from the main sound stream irrespective of whether the main sound stream is decoded and reproduced to output the sound, wherein
when an automatic content recognition operation is performed while the sound being output is not from the main sound stream, the generating includes decoding the main sound stream and generating the feature point information to be used in the automatic content recognition operation from a decoding result of the main sound stream,
the method further includes identifying the input content based on the feature point information generated from the main sound stream, and
the circuitry of the information processing device is further connected to a network, and checks a reference feature point information database in which content identification information is associated with the feature point information of the main sound stream included in the content, thereby acquiring the content identification information.

11. An information provision system comprising:
a content distribution device including first circuitry to distribute content including a main sound stream and a sub sound stream;
a client device including second circuitry to present the content distributed from the content distribution device with the main sound stream or the sub sound stream, and to generate feature point information from the main sound stream irrespective of whether the main sound stream is presented with the content; and
an information provision server to include a reference feature point information database in which the feature point information generated from the main sound stream of the content is associated with content identification information, and to provide the content identification information corresponding to an inquiry of the feature point information from the client device, wherein
when an automatic content recognition operation is performed while the sub sound stream is, and the main sound stream is not, presented with the content, the second circuitry decodes the main sound stream and generates the feature point information to be used in the automatic content recognition operation from a decoding result of the main sound stream,
the second circuitry further identifies the content based on the feature point information generated from the main sound stream, and
the second circuitry is further connected to a network, and checks the reference feature point information database, thereby acquiring the content identification information.

* * * * *